United States Patent [19]

Oizumi et al.

[11] 4,453,071
[45] Jun. 5, 1984

[54] ELECTRIC DISCHARGE MACHINE INCLUDING ROCKING MOTION FINE MACHINING AND CONTROLS THEREFORE

[75] Inventors: Toshiro Oizumi; Tetsuro Ito; Shigeo Yamada, all of Aichi, Japan

[73] Assignee: Mitsubishi Denki Kabushiki Kaisha, Tokyo, Japan

[21] Appl. No.: 422,086

[22] Filed: Sep. 23, 1982

Related U.S. Application Data

[62] Division of Ser. No. 232,030, filed as a PCT JP80/00112, May 27, 1980, publish as WO80/02665, Dec. 11, 1980, § 102(e) date Jan. 29, 1981, Pat. No. 4,370,537.

[30] Foreign Application Priority Data

| May 30, 1979 [JP] | Japan | 54-67255 |
| May 30, 1979 [JP] | Japan | 54-67256 |
| May 30, 1979 [JP] | Japan | 54-67257 |
| May 30, 1979 [JP] | Japan | 54-67258 |
| May 30, 1979 [JP] | Japan | 54-67259 |

[51] Int. Cl.³ .............................................. B23P 1/08
[52] U.S. Cl. ................................ 219/69 G; 219/69 V
[58] Field of Search .............. 219/69 V, 69 M, 69 G, 219/69 R, 68

[56] References Cited

U.S. PATENT DOCUMENTS

| 4,041,268 | 8/1977 | Braudeau et al. | 219/69 V |
| 4,057,703 | 11/1977 | Pfau | 219/69 V |
| 4,134,807 | 1/1979 | Brifford | 219/69 M |
| 4,135,070 | 1/1979 | Pfau et al. | 219/69 M |

*Primary Examiner*—M. H. Paschall
*Attorney, Agent, or Firm*—Oblon, Fisher, Spivak, McClelland & Maier

[57] ABSTRACT

Herein disclosed is an electric discharge machine, by which, after the machining operation of a workpiece by an electrode has reached a predetermined position, the machining operation is further accomplished while rocking the electrode in a plane generally normal to the feeding direction of the workpiece for the machining operation. The workpiece has its respective portion uniformly machined by effecting the machining operation accompanied by the rocking motions for a preset period, e.g., either for a predetermined time period or a predetermined number of the rocking motions so that the precision of the finishing operation can be improved.

8 Claims, 8 Drawing Figures

ELECTRIC DISCHARGE MACHINE INCLUDING ROCKING MOTION FINE MACHINING AND CONTROLS THEREFORE

This is a division of application Ser. No. 232,030, filed Jan. 29, 1981, now U.S. Pat. No. 4,370,537.

TECHNICAL FIELD

The present invention relates to improvements in an electric discharge machine which is equipped with both means for effecting such motions as feed an electrode in a direction toward a workpiece to be machined and means for effecting such rocking motions as have a directional component perpendicular to the aforementioned direction.

BACKGROUND ART

In a conventional electric discharge machining, relative motions are imparted to an electrode and a workpiece in a direction to force the former into the latter thereby to effect the machining operation while ensuring such a servo control that the gap between the aforementioned electrode and workpiece is usually maintained constant in that direction. In the usual electric discharge machining, here, after the rough machining process, a plurality of electrodes having similar shapes but slightly different sizes are used to perform the finishing process. This is partly because the rough machining process has a high machining rate but provides a rough surface whereas the finished process provides a fine surface but has a low machining rate and partly because the side gap between the electrodes and the workpiece is narrower for the finishing process than the rough machining process.

With a view to effect the rough machining process and the finishing process by means of a single electrode, therefore, there has been proposed an apparatus, by which motions having a component perpendicular to the usual feeding direction, e.g., revolving motions are imparted to the electrode and the workpiece, after the rough machining process, so that the finishing process may be accomplished by means of the electrode used for the rough machining process in a similar manner as the case in which an electrode having an apparently larger size is used.

Figure 1:
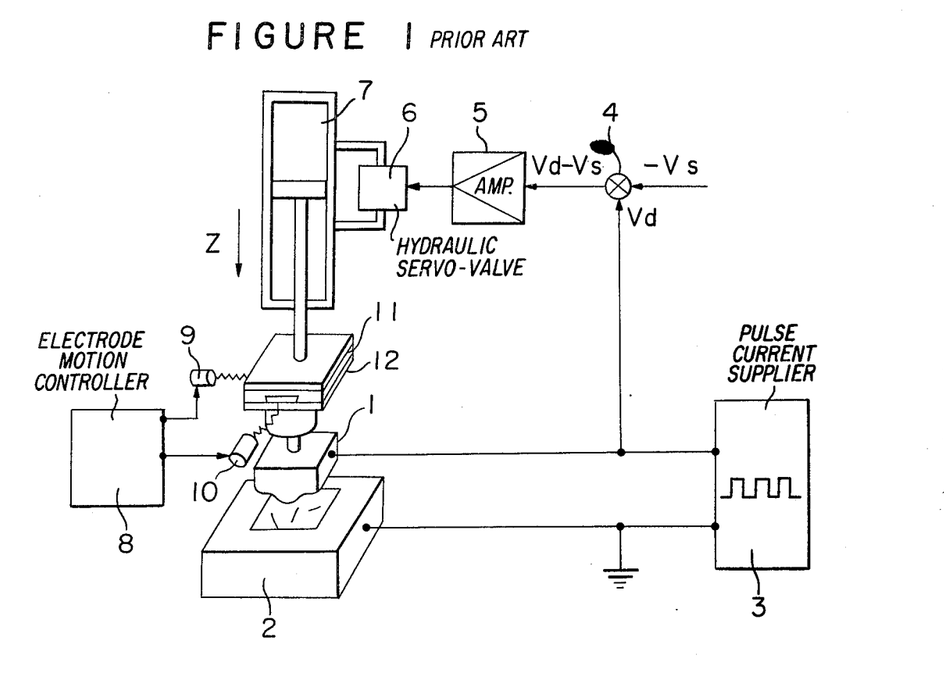
FIG. 1 is a constructional view showing an apparatus according to the prior art.

The apparatus thus proposed is shown in FIG. 1, for example. A workpiece (2) is machined by arranging an electrode (1) and the workpiece (2) in an insulating liquid in a manner to face each other and by supplying the machining gap in-between with a pulse current from a pulse current supplier (3). At this time, the electrode (1) is fed in the direction (of an axis Z) toward the workpiece (2), e.g., in a manner for a voltage $V_d$ at the machining gap to averagely coincide with a standard voltage $V_s$ by means of both a servo-circuit composed of a voltage differential circuit (4) and an amplifier (5) and a servo-mechanism composed of a hydraulic servo-valve (6) driven in response to the output signal of said servo-circuit and a hydraulic cylinder (7), thus advancing the machining operation. After the rough machining operation has been ended up to such a depth as is set at a slightly shallower position than the desired target depth, the energy of the single pulse of the pulse current supplier (3) is changed to have a smaller level, and X-Y cross tables (11) and (12) are connected by moving servo-motors (9) and (10) in a known manner by an electrode motion controller (8) thereby to perform a revolving motion. In this instance, it is sufficient the servo-motors (9) and (10) be supplied with sine waves having such voltages as have their phases made different $\pi/2$ and have their amplitudes corresponding to the difference in the side gap between the aforementioned rough machining process and finishing process. Then, the machining process is performed again up to the desired depth while effecting the relative revolving motions of the electrode (1) and the workpiece (2) in the aforementioned manner. Since, in this instance, there can be obtained an effect equal to the case in which the electrode (1) is enlarged to the size corresponding to the diameter of the relative revolving motions, the roughnesses left as the result of the preceding rough machining process can be removed.

Figure 2:
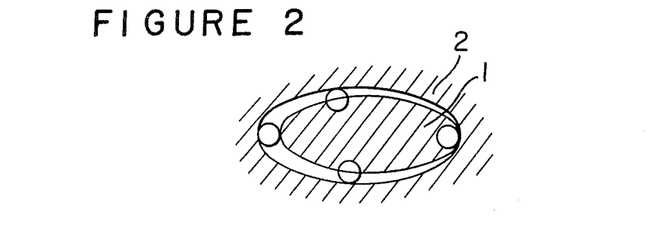
FIGS. 2 and 3 are views explaining the machining state by an oval electrode.
Figure 3:
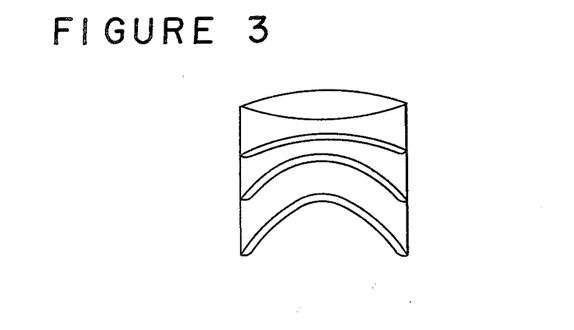

Now, in case, with the use of the electrode (1) having such an oval cross-section as is shown in FIG. 2, the workpiece (2) is machined with the corresponding hole by the aforementioned method, the extent to which the workpiece (2) is machined for each portion of the locus of the revolving motions is remarkably larger at the portion where the electrode (1) has larger radius of curvature than at the portion where the electrode (1) has a smaller radius of curvature. Consequently, as the machining operation proceeds, the depth of the machining operation at the portion having the larger radius of curvature becomes larger than that at the portion having the smaller radius of curvature so that the depthes of the machining operations become considerably different.

Therefore, the conventional apparatus thus constructed has notable drawbacks that, for a deep machining operation, the roughnesses resulting from the preceding rough machining process cannot be sufficiently cut off and that the depth which can be reached by the electrode during the finishing process becomes different for the respective portions in accordance with the shape of the electrode.

DISCLOSURE OF THE INVENTION

In view of the aforementioned drawbacks, therefore, it is an object of the present invention to improve the finishing precision by making such a construction that rocking motions are effected for a predetermined time period, while controlling an electrode not to have its deepest machining position lower than a desired machining depth, when a portion of the electrode reaches the desired machining depth.

Another object of the present invention is to improve the finishing precision partly by effecting the machining operation, while controlling the electrode not to reach the predetermined depth, when the electrode reaches that predetermined depth, and partly by imparting rocking motions to the aforementioned electrode until the normal state of the machining gap continues longer than a predetermined time period.

Still another object of the present invention is to improve the finishing precision by detecting that the finish of all the portions of the electrode has been completed sufficiently up to the predetermined depth by detecting that the time period for which the electrode is at the predetermined depth continues for the predetermined time period after the electrode has reached the predetermined depth.

A further object of the present invention is to improve the finishing precision by effecting rocking motions a desired number of times, while controlling the electrode not to have its deepest machining position lower than a desired depth, when a portion of the electrode reaches the desired depth.

According to the present invention, moreover, there is proposed an electric discharge machining controlling which can partly prevent machined chips from being left on the bottom, when the electric discharge machining operation is to be accomplished while effecting relative and periodic rocking motions along a predetermined shape between the electrode and the workpiece, by relatively increasing the speed of the aforementioned periodic rocking motions thereby to establish a flow in and stir the machining liquid existing between the electrode and the workpiece and partly ensure automatic enlargement from the position of the rough machining process to the desired final size and shape by varying the size of the aforementioned predetermined shape in accordance with the state of the machining gap.

In order to attain the aforementioned objects, the apparatus according to the present invention is equipped with both means for detecting that an electrode and a workpiece take a predetermined positional relationship as the machining operation advances and means made responsive to the signal from said detecting means for generating a command for effecting a rocking machining operation for a predetermined period when and after the aforementioned predetermined positional relationship is taken.

BEST MODE FOR PRACTISING THE INVENTION

Figure 4:
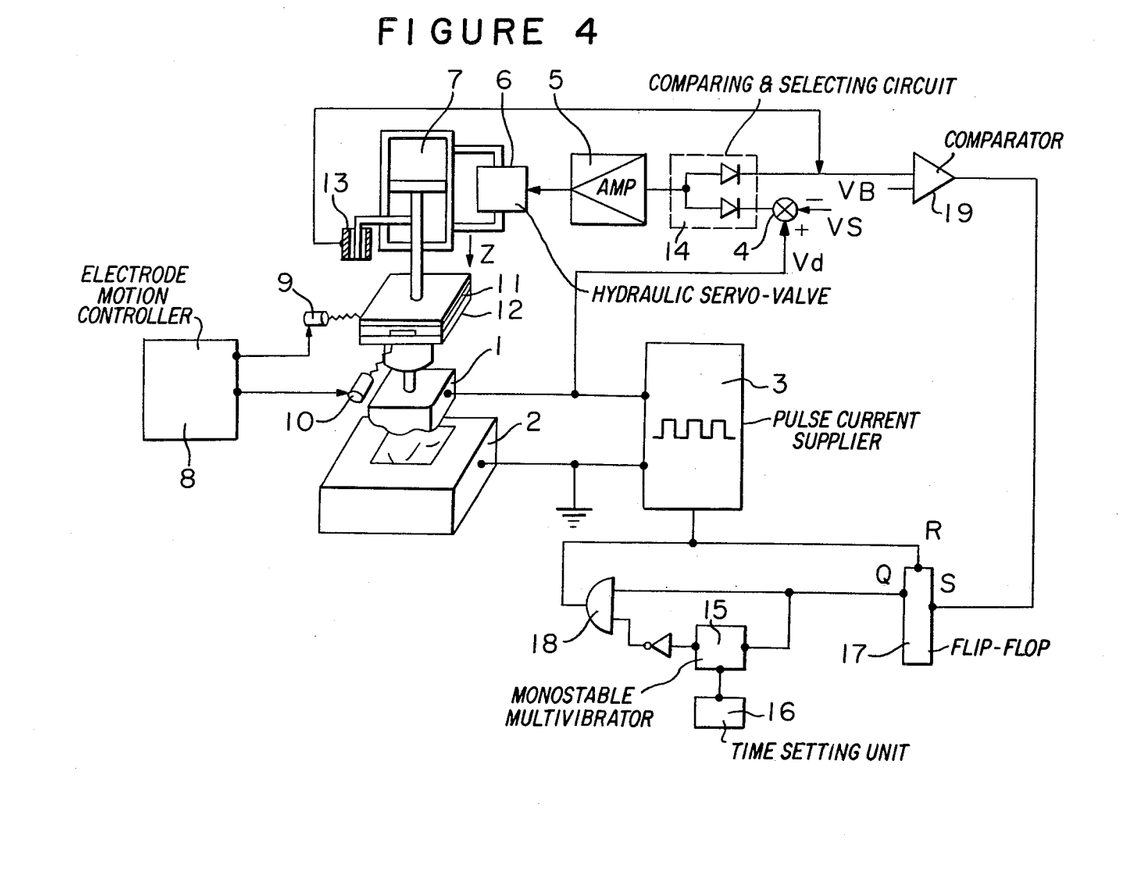
FIG. 4 is a constructional view showing one embodiment of the apparatus according to the present invention.

FIG. 4 shows one embodiment of the apparatus according to the present invention, which is similar to the conventional apparatus, as shown in FIG. 1, in that the X-Y cross tables (11) and (12) are operated by driving the servo-motors (9) and (10) in response to the signal from the electrode motion controller (8) so that the relative revolving motions are effected between the electrode (1) and the workpiece (2).

On the other hand, a differential transformer (13) is so constructed as to have its coil portion fixed to the stationary side of the machine and its movable core made movable in the direction of the axis Z in a similar manner to the electrode (1). Moreover, reference numeral (14) indicates a circuit, which is similar to the circuit (12) disclosed in Japanese Examined Patent Publication No. 53-32112, for example, and a comparing and selecting circuit for predominantly selecting the larger one of the differential voltage $V_d - V_s$ between the voltage $V_d$ at the machining gap and the standard voltage $V_s$ and the output of the differential transformer (13). Here, in the operations of said comparing and selecting circuit (14), as is described in detail in the aforementioned Japanese Patent Publication No. 53-32112, if the coil portion of the differential transformer (13) fixed to the stationary side of the machine is positioned in advance, the position of the electrode (1) is controlled above the predetermined position in accordance with the differential voltage $V_d - V_s$ between the voltage $V_d$ at the machining gap and the standard voltage $V_s$. If the aforementioned predetermined position is reached, on the other hand, the electrode is so controlled by predominantly selecting the output of the differential transformer (13) that it is not moved to a position lower than said predetermined position by the servo-mechanism composed of the servo-valve (6) and the hydraulic cylinder (7).

Next, in the operations of the apparatus according to the embodiment under consideration, the time period for the desired revolving motions at the set machining position of the electrode (1) is set by the time setting unit (16) of a monostable multivibrator (15) usually composed of a resistor and a condenser, and a flip-flop (17) is reset so that an AND gate (18) is closed.

Then, while the machining operation is advancing, the output of the differential transformer (13) is compared with a comparison voltage $V_B$ by a comparator (19). Since the comparison voltage $V_B$ is lower, the output of the comparator (19) is held at a zero level thereby to exert no influence upon the flip-flop (17). When the machining operation further proceeds until the electrode (1) reaches the predetermined machining position, the output of the differential transformer (13) becomes lower than the comparison voltage $V_B$ of the comparator (19) so that the output of said comparator (19) takes a value of 1. In response to this output then, the flip-flop (17) is set so that its Q output also takes a value of 1, which is fed to the AND gate (18). At this time, since the Q output of the aforementioned flip-flop (17) also enters the monostable multivibrator (15), this monostable multivibrator (15) operates to generate an output of 1 for a time period which is set by the time setting unit (16). On the other hand, the inverted signal of that output is fed to the AND gate (18) so that the output of the AND gate (18) is held at the zero level while the aforementioned monostable multivibrator (15) is operating. After the time period set by the time setting unit (16) has elapsed, the output of the AND gate (18) takes the level 1, which is exerted as a machining operation ending signal upon the pulse current generating unit (3) while resetting the flip-flop (17), thus ending a series of operations.

During the operation of the monostable multivibrator (15), at this time, since the position of the electrode (1) is not brought to a position lower than that which is set by the aforementioned differential transformer (13), the portion of the workpiece (2), which is left unmachined, is gradually machined.

If an ample time is set for the aforementioned time setting unit (16) in that way, all the portion of the workpiece left unmachined can be machined after the portion of the electrode (1) has reached the desired machining depth. As a result, even in case the finishing process is to be accomplished after the rough machining process, no roughness can be left while improving the finishing precision.

Figure 5:
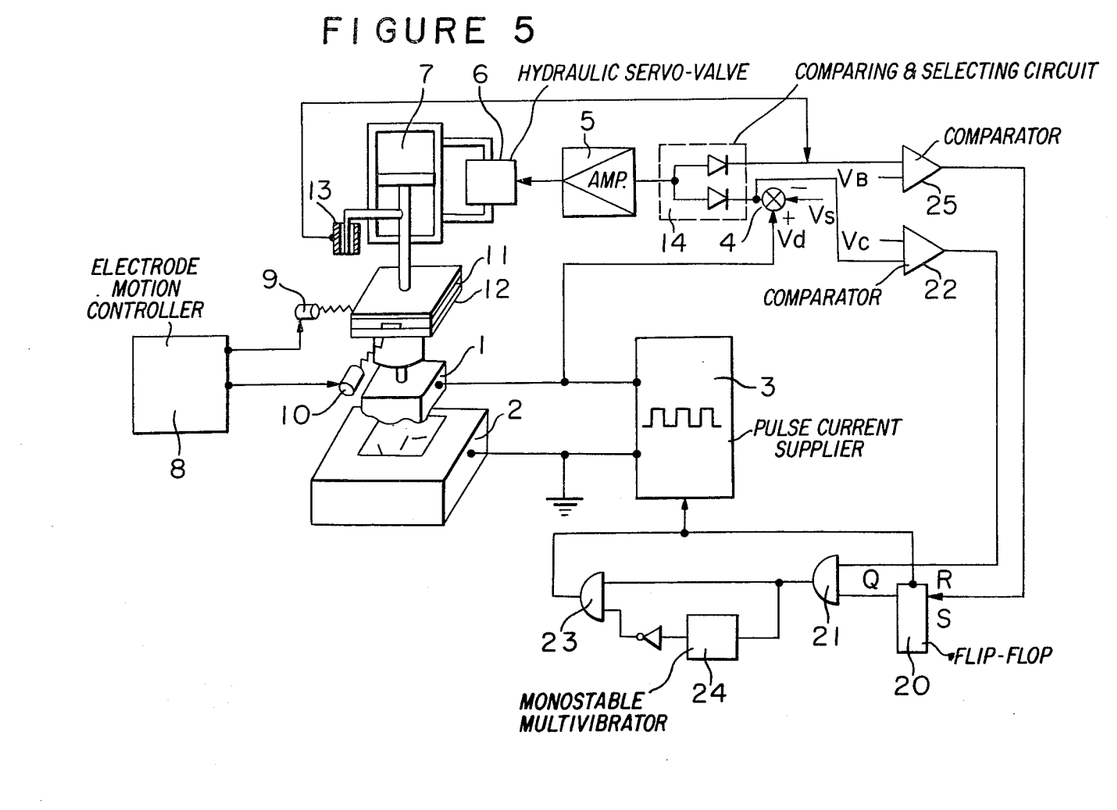
FIG. 5 is a constructional view showing another embodiment of the present invention and an apparatus of the type, in which the machining operation is interrupted if the time period for which the voltage at a machining gap is higher than a standard level continues for a predetermined period.

FIG. 5 shows another embodiment of the apparatus according to the present invention, which is also similar to the conventional apparatus, as shown in FIG. 1, in that the X-Y cross tables (11) and (12) are operated by driving the servo-motors (9) and (10) in response to the signal from the electrode motion controller (8) so that the relative revolving motions are effected between the electrode (1) and the workpiece (2). ON the other hand, the differential transformer (13) is so constructed that its coil portion is fixed to the stationary side of the machine whereas its movable core is made movable in the direction of the axis Z in a similar manner to the electrode (1). On the other hand, the reference numeral (14) indicates the comparing and selecting circuit for predominantly selecting the lower one of the differential voltage between the voltage $V_d$ at the machining gap and the standard voltage $V_s$ and the output of the differential transformer (13).

The operations of the apparatus according to this second embodiment will be described. First of all, while the electrode (1) is accomplishing its machining operation before it reaches the predetermined machining depth, the output of the differential transformer (13) is higher than the comparison voltage $V_B$ of the comparator (25) so that the output of this comparator (25) takes the zero level. Moreover, since the machining gap is so controlled that the differential voltage $V_d - V_s$ takes the zero level by the actions of the aforementioned machining gap servo-circuits (4) and (5) and the aforementioned machining gap servo-mechanism (6) and (7), a relationship of $V_d - V_s < V_c$ holds so that the output of the comparator (25) is also at the zero level. At this time, a flip-flop (20) (which will be shortly referred to as "F/F") is reset so that its Q output is at the zero level. Here, when the machining operation further proceeds until the electrode (1) reaches the predetermined machining depth, the output of the differential transformer (13) becomes lower than the comparison voltage $V_B$ of the comparator (25) so that the output of said comparator (25) takes the output at the level 1, whereby the F/F (20) is set to take its Q output at the level 1. This output is fed to an AND gate (21), but the other input of the AND gate (21) is at the zero level so that the AND gate (21) is left closed. At this time, since the electrode (1) is prevented from becoming lower than the predetermined machining depth set by the differential transformer (13), the voltage $V_d$ at the machining gap is gradually raised, until the output $V_d - V_s$ of the voltage differential circuit (4) becomes higher than the level $V_c$ after a present time elapses, so that the output of a comparator (22) takes the level 1. Then, since the AND gate (21) is opened, its output takes the value 1 and is fed to one of the input terminals of an AND gate (23). This signal at the level 1 simultaneously operates a monostable multivibrator (24) (which will be shortly referred to as "OSM") thereby to generate an output at the level 1. Since this output of the OAM (24) is converted through the inverting element into a zero signal until it is fed to the AND gate (23), this gate (23) has an output at the zero level. Here, the OSM (24) is of the type, in which the operation is effected even with an input during operation. As a result, if the output of the AND gate (21) is still at the level 1 after the operation of the OSM (24) has been ended, i.e., if the voltage $V_d - V_s$ corresponding to the state of the machining gap is higher than the voltage $V_c$, the output of the AND gate (23) takes the level 1 thereby to reset the F/F (20), while exerting its action as the machining operation ending signal upon the pulse current supplier (3), thus ending a series of the operations. If, therefore, the operating time of the OSM (24) is reserved sufficient, the portions of the workpiece (2) left unmachined are gradually machined.

If the electric discharge machining is accomplished in the aforementioned manner by the use of the apparatus according to the present invention, all the portions of the workpiece left unmachined can be machined after the electrode has reached the predetermined machining depth. As a result, even in case the finishing process is to be performed after the rough machining process, it is possible to prevent the roughnesses from being left while improving the finishing precision.

Figure 6:
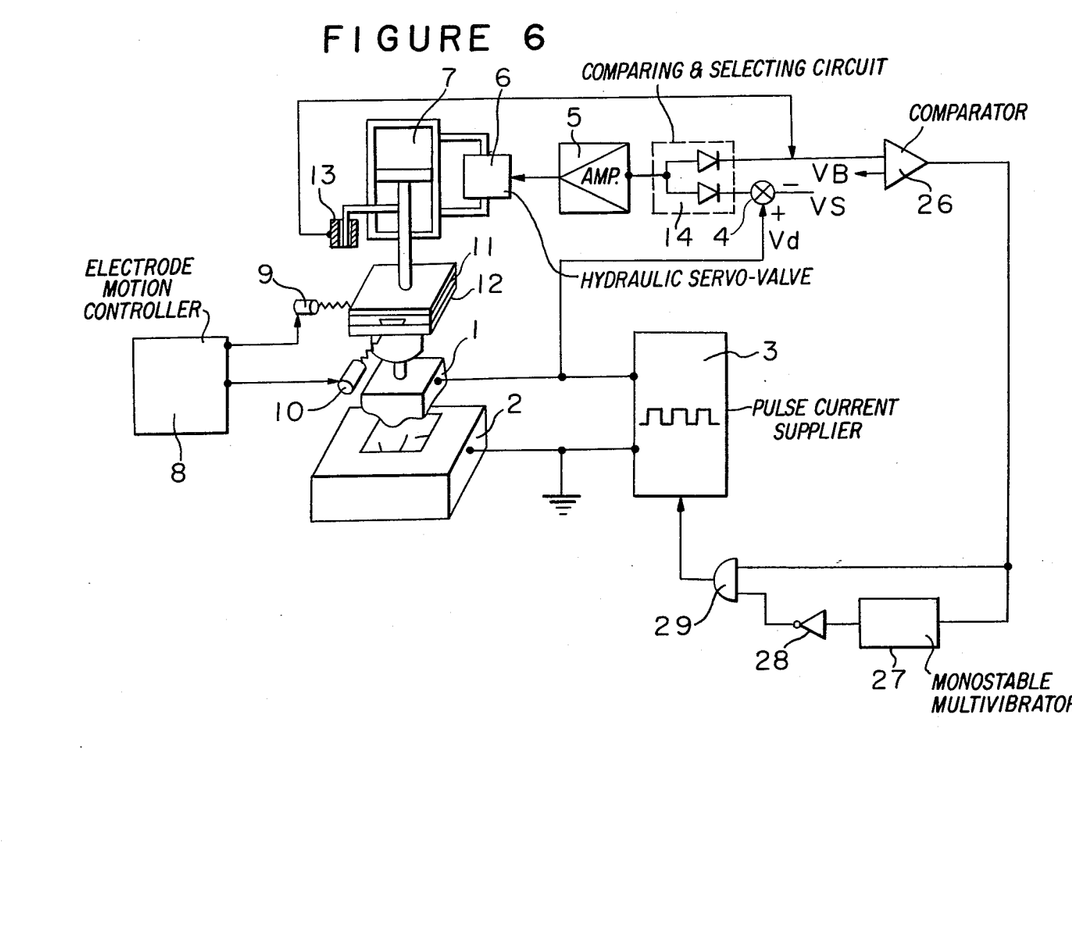
FIG. 6 is a constructional view showing still another embodiment of the present invention and an apparatus of the type, in which the machining operation is interrupted if a predetermined positional relationship between the electrode and the workpiece continues for a predetermined time period.

FIG. 6 shows still another embodiment of the present invention. In the operations of the apparatus according to this embodiment, while the machining operation is proceeding under the condition in which the electrode (1) is higher than the predetermined position set by the differential transformer (13), the output of the differential transformer (13) is compared by a comparator (26) with the comparison voltage $V_B$. Since, moreover, the comparison voltage is lower as a result of the comparing operation, the output of the comparator is held at the zero level.

If the machining operation further proceeds until the electrode (1) reaches the predetermined machining position, the output of the differential transformer (13) becomes lower than the comparison voltage $V_B$ of the comparator (26) so that the output of said comparator (26) takes the level 1. Then, a monostable multivibrator (27) (which will also be shortly referred to as "OSM") operates for a predetermined time period so that its output takes the level 1 and is fed to an inverting element (28) thereby to close the AND gate (29). Here, at the initial stage in which the electrode (1) reaches the predetermined machining position, the depth of the machined hole in the workpiece (2) becomes irregular in accordance with the shape of the electrode (1) so that the electrode (1) is moved upward during the operating time of the aforementioned OSM (27) thereby to reduce the output of the comparator (26) to the zero level. As a result, the output of the AND gate (29) maintains its zero state. Since the irregularity of the machining depth of the aforementioned machined hole is eliminated as a certain time period elapses in that way, the time period for which the electrode (1) resides at the predetermined machining position is gradually elongated. When that time period exceeds the operating time period of the OSM (27), the output of the AND gate (29) takes the level 1 and exerts its action as the machining operation ending signal upon the pulse current supplier (3), thus ending a series of the operations.

If the aforementioned monostable multivibrator (27) is so set in that way that it can operate for a sufficient time period, all the portions of the workpiece left unmachined can be machined after the portion of the electrode (1) has reached the desired machining depth. As a result, even in case the finishing process is to be performed after the rough machining process, no roughness can be left while improving the finishing precision.

Figure 7:
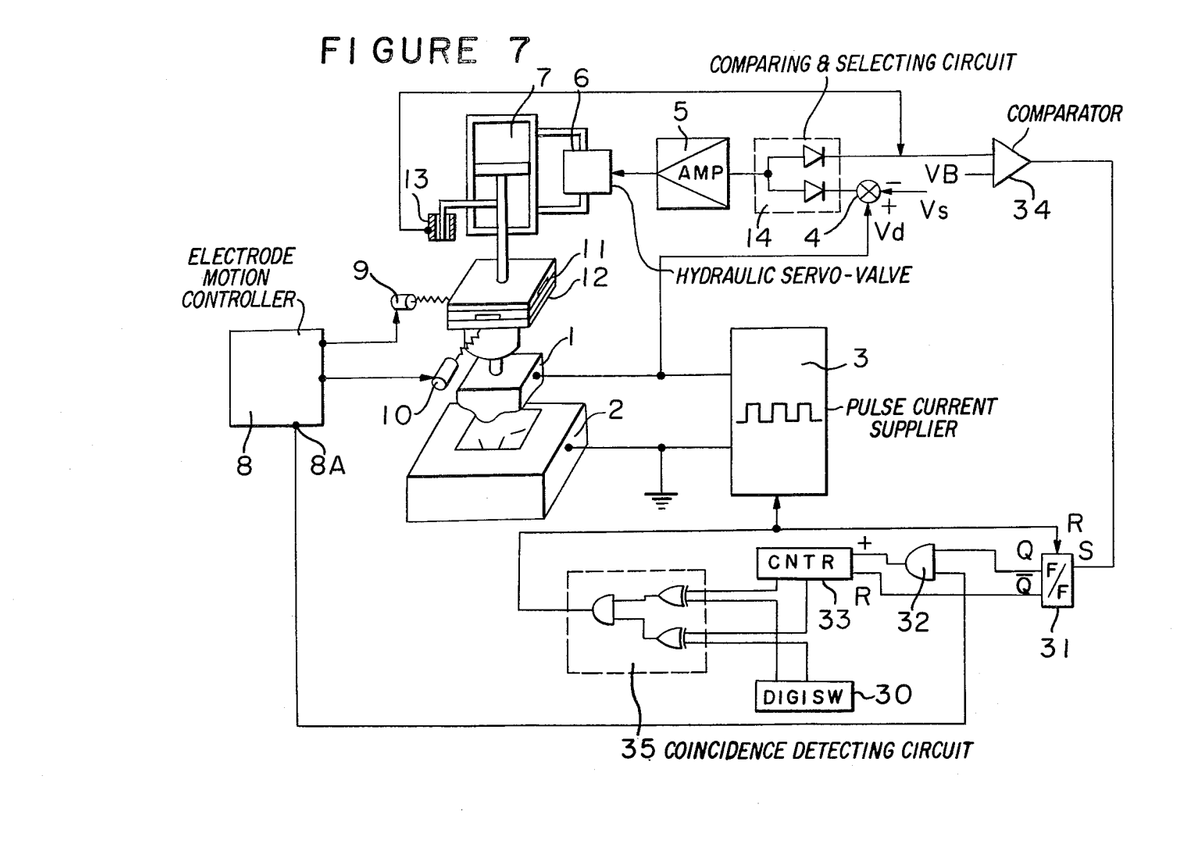
FIG. 7 is a constructional view showing a further embodiment of the present invention and an apparatus of the type, in which the number of times of rocking motions can be set.

FIG. 7 is a view showing a further embodiment of the apparatus according to the present invention, which is similar to the conventional apparatus, as shown in FIG. 1, in that the X-Y cross tables (11) and (12) are operated by driving the servo-motors (9) and (10) in response to the signal from the electrode motion controller (8) thereby to effect the relative revolving motions between the electrode (1) and the workpiece (2). However, the electrode motion controller (8) is equipped with an output terminal (8A), at which a pulse is generated each period of the motions of the electrode (1).

The operations of the apparatus according to this embodiment will be described in the following. Since the desired number of the revolving motions of the electrode (1) is set by a revolution number setting unit (30) which is constructed of a digital switch or the like, and since a flip-flop (13) (which will also be shortly referred to as "F/F") is reset, the Q output of the F/F (31) is at the zero level so that an AND gate (32) is closed.

As the machining operation proceeds, an output is generated each period of the revolving motions of the electrode at the output terminal (8A) of the aforementioned electrode motion controller (8) but is not added to the counter (33) because the AND gate (32) is closed, as has been described in the above. On the other hand, since the $\overline{Q}$ output of the aforementioned F/F (31) is fed to the reset terminal of a counter (33), the content of the counter (33) is at the zero level.

Now, if the machining operation further proceeds until the portion of the electrode (1) reaches the predetermined machining position, the output of the differential transformer (13) becomes lower than the comparison voltage $V_B$ of a comparator (34) so that the output of this comparator (34) takes the level 1. In response to this output, the F/F (31) is set to have its Q output at the level 1 so that the AND gate (32) generates a signal each time the pulse is generated at the output terminal (8A) of the electrode motion controller (8) until it is added to the counter (33). To this counter (33), in other words, there is added the number of the revolving motions of the electrode after the electrode (1) has reached the predetermined depth. Here, if the content in the counter (33) and the content set in the aforementioned revolving number setting unit (30) become coincident, a coincidence signal is generated by a coincidence detecting circuit (35) thereby to reset the F/F (31), while exerting its action as the machining operation ending signal upon the pulse current supplier (3), thus ending a series of the operations. Since the position of the electrode (1) is prevented from becoming lower than the position predetermined by the aforementioned differential transformer (13) while the pulses are counted by the counter (33), the portions of the workpiece (2) left unmachined are gradually machined.

If a sufficient number is set in that way in the aforementioned revolving number setting unit (30), all the portions of the workpiece left unmachined can be machined after the portion of the electrode (1) has reached the desired machining depth. As a result, no roughness can be prevented from being left, even in case the finishing process is to be performed after the rough machining process, while improving the finishing precision.

Now, in the aforementioned various embodiments, if an eccentricity is so determined when the process is shifted from the finishing mode after the rough machining mode as to correspond to the desired final shape. The circuit is shortened between the electrode and the workpiece at the initial stage of the finishing process, thus inviting the unabled state of the machining operation. In the machining operation of such revolving motions as have a directional component perpendicular to the usual feeding operation of the electrode, moreover, the machined chips, which are generated during the machining operation of the side of the electrode (which corresponds to the machining direction of the revolving motions), are liable to be left on the bottom of the electrode. As the machining operation proceeds, therefore, it is highly possible for the circuit to be shortened not only in the side direction of the electrode but also in the bottom direction of the electrode. Once an abnormal matter such as the short-circuit takes place in the bottom direction, this short-circuit in the bottom direction is not eliminated yet even after the sideway machining gap of the electrode is enlarged by the servo control. As a result, the machining rate may be deteriorated. In order to eliminate this difficulty, the rocking motion effecting unit is further controlled according to the present invention. This will be described in the following.

Figure 8:
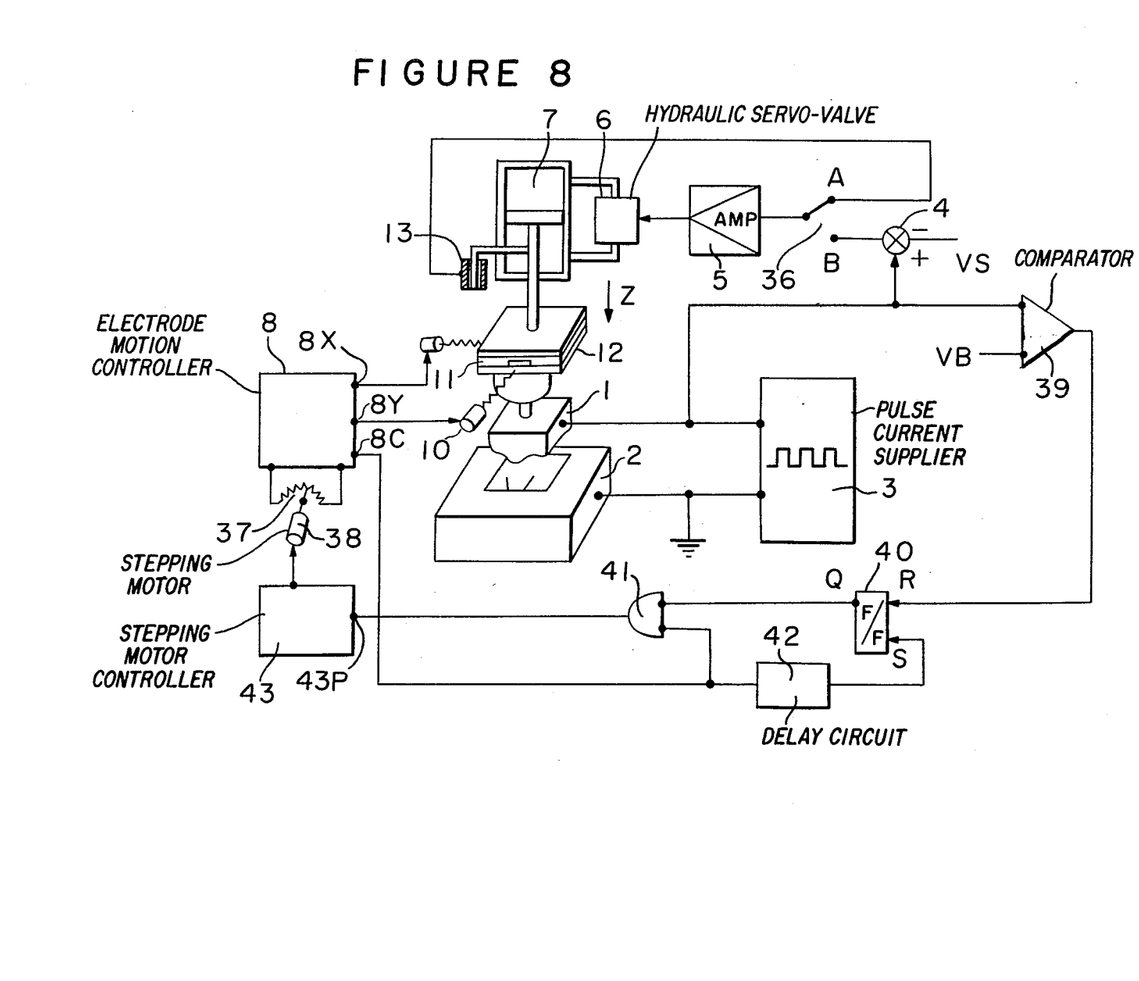
FIG. 8 is a constructional view showing a further embodiment of the present invention and an apparatus of the type, in which the locus of the rocking motions is changed.

With reference to FIG. 8, the workpiece (2) is machined by arranging the electrode (1) and the workpiece (2) to face each other in the machining liquid so that the pulse current from the pulse current supplier 3 may be supplied to the machining gap between the aforementioned electrode (1) and workpiece (2). Here, in the case of the rough machining process, a servo-changing switch (36) for the machining gap of the positioning servo is in the direction B, whereupon the electrode (1) is fed in the direction (of the axis Z) toward the workpiece (2), e.g., in a manner for the voltage $V_d$ at the machining gap to averagely become coincident with the standard level $V_s$ by means of both the servo-circuit composed of the voltage differential circuit (4) and the amplifier (5) and the servo-mechanism composed of the hydraulic servo-valve (6) driven in response to the output signal of said servo-circuit and the hydraulic cylinder (7), thus advancing the machining operation. At this time, since the servo-motors (9) and (10) are so constructed as to be fed with no voltage, the positions of the electrode (1), which is attached to the X-Y cross tables (11) and (12), in the X and Y directions are not shifted. When the machining operation thus reaches the predetermined depth, the servo-changing switch (36) is shifted to the terminal A. Here, since the differential transformer (B) is so constructed that its coil side is fixed to the stationary side of the machine whereas its movable core can move in the direction of the axis Z similarly to the electrode (1), the position of the electrode (1) is subjected to such a servo-control that it is brought to the aforementioned predetermined depth or that the error signal of the differential transformer (13) is reduced to zero. Here, the electrode motion controller (8) is so constructed it generates a voltage of Er Sin wt and a voltage of Er Cos wt at its terminals (8X) and (8Y), respectively, which are impressed upon the servo-motors (9) and (10) thereby to effect the revolving motions of the electrode (1). On the other hand, the voltage Er corresponding to the radius of the revolving motions can be controlled by a variable resistor (37), the resistance of which is stepwise varied in accordance with the rotations of a stepping motor (38).

When the process is to be shifted to the finishing mode, the machining condition suitable for the subsequent finishing process is selectively set by the pulse current supplier (3). If the voltage Er is so set that the radius of the aforementioned revolving motions becomes the minimum and if the finishing process is started, the voltages Er Sin wt and Er Cos wt are generated at the terminals (8X) and (8Y) of the electrode motion controller (8), respectively. As a result, the servo-motor (9) and (10) are driven so that the revolving motions are imparted to the electrode (1) which is attached to the X-Y cross tables (11) and (12). Here, the electrode motion controller (8) is so constructed that a pulse signal is generated at its terminal (8C) each period of the voltage at the terminal (8X) or (8Y). On the other hand, the voltage at the machining gap is fed to a comparator (39). Thus, if this voltage becomes lower than the comparison voltage $V_B$, the comparator (39) generates a voltage at the level 1 at its output to reset a flip-flop (40) (which will also be shortly referred to as "F/F") so that the output Q of this F/F (40) is reduced to zero thereby to close an AND gate (41). On the other hand, when the voltage at the machining gap becomes higher than the comparison voltage $V_B$, the output of the comparator (39) is held at the zero level thereby to exert no influence upon The F/F (40). Now, when the pulse signal is generated at the terminal (8C) of the electrode motion controller (8), as has been described in the above, it is delayed as large as its pulse width by a delay element (42) until it is fed to the set terminal of the F/F (40) so that the Q output of the F/F (40) takes the level 1 thereby to open the AND gate (41). As a result, if the voltage at the machining gap fails to become lower than the comparison voltage $V_B$ during one period of the subsequent revolving motion of the electrode (1), i.e., by the time the pulse signal is generated at the terminal (8C), the Q output of the F/F (40) remains set at the level 1 so that the AND gate (41) is left open. Moreover, if the subsequent pulse signal is generated at the aforementioned output terminal (8C), it is fed through the AND gate (41) to the terminal (43P) of the control circuit (43) of the stepping motor (38) thereby to drive the stepping motor (38). Then, the resistance of the variable resistor (37) is changed one step so that the amplitude Er of the voltage at the terminals (8X) and (8Y) of the electrode motion controller (8) is raised one step thereby to enlarge the radius of the revolving motions of the electrode (1). If, in this way, the voltage at the machining gap is held higher than the comparison voltage $V_B$ of the comparator (39), the state of the machining gap is deepened normal so that the radius of the revolving motions of the electrode (1) is gradually stepwise enlarged. In case, however, the circuit is shortened at the machining gap by the machined chips or the like, the output of the comparator (39) takes the level 1. As a result, the F/F (40) is reset to close the AND gate (41) so that no pulse signal is fed to the stepping motor controller (43). As a result, the stepping motor (38) is not driven, and the radius of the revolving motions of the electrode (1) is neither changed so that the revolving motions of the same radius are repeated. In this meanwhile, the machining liquid is stirred to discharge the machined chips or the like, which might otherwise cause the circuit to be shortened, so that the normal state is restored.

In this way, when the radius of the aforementioned revolving motions is to be stepwise enlarged, the control of the enlargement is effected by the voltage at the machining gap. As a result, it is possible to prevent the circuit from being shortened by the machined chips or the like at the machining gap. Moreover, since the machined chips can be prevented from residing at the bottom by increasing the revolving speed, the machining efficiency can be remarkably enhanced.

Here, it is desired that the extent to which the radius of each step described in the above is enlarged be smaller than the machining gap. On the other hand, although the periodic translational motion is explained in terms of the revolving motion, it can naturally be applied to another mode. In the embodiment, moreover, although the servo-changing switch (36) is used, it can be replaced by the comparing and selecting circuit which has been disclosed in the foregoing embodiments.

Now, in the aforementioned various embodiments, although the differential transformer is positioned before the machining operation at the desired maching depth so that the times of the motions of the electrode may be set at that position, it is also possible to stepwise shift the position of the aforementioned differential transformer. In this modification, the rocking machining term set can be determined for each step. In the aforementioned various embodiments, moreover, although the shape of the motions of the electrode is circular, it is quite natural that the present invention can be applied to the case in which the electrode is made to accomplish the motions of another shape.

We claim:

1. An electric discharge machine comprising: an electric power source for supplying an electric discharge machining energy between an electrode and a workpiece to be machined; feeding means for effecting a relative feeding motion between said electrode and said workpiece in a certain direction; and means for effecting predetermined relative rocking motions as have a directional component perpendicular to said certain direction, whereby said electric discharge machining energy is supplied from said electric power source, while effecting the rocking motions by said rocking motion effecting means, thereby to make it possible to accomplish a rocking machining operation, wherein the improvement comprises: position detecting means for detecting the positional relationship in said certain direction between said electrode and said workpiece and producing an output signal indicative of said positional relationship; means for detecting the state of the machining gap between said electrode and said workpiece and for producing and output signal indicative of said machining gap state; holding means for controlling said relative feeding motion effecting means in response to the output signal of said position detecting means and the output signal of said machine gap state detecting means thereby to hold said electrode and said workpiece in said predetermined positional relationship in said certain direction and then to advance said electrode only in said certain direction in dependence on the state of said machining gap as indicated by said output signal of said machining gap state detecting means; and means for controlling said rocking motion effecting means in response to the output signal of said machining gap state detecting means thereby to change the locus of said rocking motions.

2. An electric discharge machine as set forth in claim 1, wherein the size of the locus enlarged by said rocking motion effecting means in response to the locus-change command output from said rocking motion effecting means is smaller than a distance between said electrode and said workpiece.

3. An electric discharge machine as set forth in claim 1, wherein said relative rocking motion effecting means generates its signal each period of said rocking motions.

4. An electric discharge machine as set forth in claim 1, wherein said locus changing means supplies said rocking motion effecting means with a command for enlarging the locus of said rocking motions in response to the signal in which said machining gap state detecting means has detected the normal state of said machining gap.

5. An electric discharge machine as set forth in claim 3, wherein said locus changing means includes: means for generating a signal if said machining gap is in a normal state during the predetermined period of said rocking motions; and means adapted to be supplied with both the signal, which is generated by said relative rocking motion effecting means for each period of said rocking motions, and the signal of said signal generating means thereby to generate a command for enlarging the locus of said rocking motions each time it receives the periodic output of said relative rocking motion effecting means while it is receiving the signal of said signal generating means.

6. An electric discharge machine as set forth in claim 1, wherein said locus changing means changes the locus of said rocking motions by supplying said relative rocking motion effecting means with a voltage command corresponding to the size of said locus.

7. An electric discharge machine as set forth in claim 6, wherein said locus changing means includes a variable resistor for supplying said relative rocking motion effecting means with the voltage command corresponding to the size of the locus of said rocking motions, whereby the resistance of said variable resistor is changed to change said locus.

8. An electric discharge machine as set forth in claim 7, wherein said locus changing means further includes drive means for changing the resistance of said variable resistor.

* * * * *

UNITED STATES PATENT AND TRADEMARK OFFICE
CERTIFICATE OF CORRECTION

PATENT NO. : 4,453,071

DATED : JUNE 5, 1984

INVENTOR(S) : TOSHIRO OIZUMI ET AL.

It is certified that error appears in the above-identified patent and that said Letters Patent is hereby corrected as shown below:

Column 10, line 58,

Claim 1, line 7 from the bottom, change "only in said certain direction" to --only in the direction perpendicular to said certain direction--

Column 7, line 20, change "a flip-flop (13)" to --a flip-flop (31)--.

Column 8, line 52, change "transformer (B)" to --transformer (13)--.

Signed and Sealed this

Fourth Day of July, 1989

Attest:

DONALD J. QUIGG

*Attesting Officer*   *Commissioner of Patents and Trademarks*